United States Patent
Butler et al.

(10) Patent No.: US 9,493,894 B2
(45) Date of Patent: Nov. 15, 2016

(54) INTERIOR PANEL FOR VEHICLE

(71) Applicant: Spectra Aerostructures of South Carolina, Inc., Greer, SC (US)

(72) Inventors: Robin Butler, Winston-Salem, NC (US); Joseph C. Moon, Greer, SC (US); Steven F. Nielsen, Charlotte, NC (US); David Bryan Starrett, Greer, SC (US); Barry Strauss, Beaufort, SC (US); Bryan P. Thomas, York, SC (US)

(73) Assignee: Spectra Aerostructures of South Carolina, Inc., Greer, SC (US)

( * ) Notice: Subject to any disclaimer, the term of this patent is extended or adjusted under 35 U.S.C. 154(b) by 536 days.

(21) Appl. No.: 13/915,964

(22) Filed: Jun. 12, 2013

(65) Prior Publication Data

US 2014/0370773 A1   Dec. 18, 2014

(51) Int. Cl.
| | |
|---|---|
| *D04H 1/4242* | (2012.01) |
| *B60R 13/02* | (2006.01) |
| *D04H 1/587* | (2012.01) |
| *C08J 5/04* | (2006.01) |
| *B29C 70/42* | (2006.01) |
| *B29C 70/12* | (2006.01) |
| *B29K 81/00* | (2006.01) |

(52) U.S. Cl.
CPC ............ *D04H 1/4242* (2013.01); *B29C 70/12* (2013.01); *B29C 70/42* (2013.01); *B60R 13/02* (2013.01); *C08J 5/04* (2013.01); *C08J 5/042* (2013.01); *D04H 1/587* (2013.01); *B29K 2081/04* (2013.01); *C08J 2371/00* (2013.01); *C08J 2379/08* (2013.01); *C08J 2381/04* (2013.01); *Y10T 442/20* (2015.04); *Y10T 442/2959* (2015.04); *Y10T 442/2984* (2015.04)

(58) Field of Classification Search
CPC ......... C08J 5/00; C08J 5/042; D04H 1/4242; D06M 15/19
USPC ......... 428/292.1, 297.4, 299.1; 442/59, 176; 264/136
See application file for complete search history.

(56) References Cited

U.S. PATENT DOCUMENTS

| | | | |
|---|---|---|---|
| 6,065,717 | A | 5/2000 | Boock |
| 6,158,690 | A | 12/2000 | Wadey et al. |
| 6,547,184 | B2 | 4/2003 | Nieberle |
| 6,762,138 | B2 | 7/2004 | Ferreira et al. |
| 6,808,224 | B1 | 10/2004 | Obara |
| 7,104,590 | B2 | 9/2006 | Dooley et al. |
| 7,210,655 | B2 | 5/2007 | Novak et al. |

(Continued)

FOREIGN PATENT DOCUMENTS

| | | |
|---|---|---|
| JP | 55-082130 A | 6/1980 |
| JP | 2000-108804 A | 4/2000 |

*Primary Examiner* — Arti Singh-Pandey
(74) *Attorney, Agent, or Firm* — Hammer & Associates, P.C.

(57) ABSTRACT

An interior component for a vehicle may include a nonwoven fabric impregnated with a resin. The nonwoven fabric and resin are consolidated into a solid sheet devoid of pockets. The interior component may exclude metal coated filler particles and lubricants. The method of making the interior component includes the steps of: forming a nonwoven fabric of a staple fiber and a resin, consolidating the nonwoven fabric and the resin into a solid sheet, and forming the solid sheet into the vehicle component. The vehicle may be an airplane, train, subway car, light rail car, bus, or automobile. The resin may be a polymer selected from the group consisting of polyphenylene sulfide, polyetherimide, polyaryletherketone, co-polymers thereof, and combinations thereof.

21 Claims, 1 Drawing Sheet

(56) References Cited

U.S. PATENT DOCUMENTS

| | | |
|---|---|---|
| 7,237,933 B2 | 7/2007 | Radu et al. |
| 7,244,501 B2 | 7/2007 | Raghavendran et al. |
| 7,246,772 B2 | 7/2007 | Drost et al. |
| 7,387,828 B2 | 6/2008 | Guevel et al. |
| 7,682,697 B2 | 3/2010 | Raghavendran et al. |
| 7,785,694 B2 | 8/2010 | Muller et al. |
| 8,011,717 B2 | 9/2011 | Endo et al. |
| 8,129,462 B2 | 3/2012 | Hsu et al. |
| 8,181,421 B2 | 5/2012 | Shaw |
| 8,299,159 B2 | 10/2012 | Chandrasekhar et al. |
| 8,349,245 B2 | 1/2013 | Ishida et al. |
| 2004/0056382 A1 | 3/2004 | Shaner et al. |
| 2005/0189775 A1 | 9/2005 | De Pue |
| 2005/0189779 A1 | 9/2005 | Wojewnik |
| 2006/0054482 A1 | 3/2006 | Radu |
| 2006/0154027 A1 | 7/2006 | Dry |
| 2007/0161309 A1 | 7/2007 | Villeneuve |
| 2008/0169678 A1 | 7/2008 | Ishida et al. |
| 2010/0170746 A1* | 7/2010 | Restuccia et al. ............ 181/290 |
| 2010/0225144 A1 | 9/2010 | Endo et al. |
| 2011/0084164 A1 | 4/2011 | Lee |
| 2011/0108667 A1 | 5/2011 | Keller et al. |
| 2012/0299329 A1 | 11/2012 | Schidan et al. |

* cited by examiner

INTERIOR PANEL FOR VEHICLE

FIELD OF THE INVENTION

An interior panel for a vehicle, such as an airplane, train, subway car, light rail car, bus, or automobile, and its method of manufacture are disclosed.

BACKGROUND OF THE INVENTION

In the commercial passenger transportation industry, reducing vehicle weight can increase fuel efficiency (i.e., reduce fuel consumption). For example, in the airline industry, it is estimated that a reduction of 250 pounds in airplane weight may yield a fuel cost savings of about 1 million dollars per year.

Vehicle interiors are an important aesthetic aspect of the vehicle for passenger satisfaction. The interior must be pleasing to the eye, but must also be, among other things, safe, easy to maintain, durable, and resistant to the abuse that is normally encountered during the transport of passengers.

Heretofore, vehicle interior panels have been made of composite materials. Vehicle interior panels may include, for example, window panels, ceiling panels, floor panels, overhead bins and bin doors, lavatory and galley wall structures, class divider and bulkhead panels, and the like. One such composite has a honeycomb center sheet (NOMEX or aluminum) covered on one or both sides with a skin of a woven glass filament fiber sheet impregnated with a phenolic (thermoset) resin. These composite materials range in thickness from 0.125 to 1.5 inches and may be attached directly to the vehicle frame. Woven carbon filament fiber has been used in place of the woven glass filament fiber. Trim pieces, window/door molding, overhead bins, arm rests, and the like, may be made from moldable plastic (typically a thermoplastics) that may be subsequently covered (laminated, skinned) with a decorative plastic film. Materials used in vehicle interiors include: KYDEX from Kydex LLC of Bloomsburg, Pa. (acrylic-PVC), BOLTARON from Boltaron of Newcomerstown, Ohio (PVC-acrylic), ULTEM from Sabic of Pittsfield Mass. (PEI, PEI/glass fiber).

Additionally, vehicle (aircraft) interiors must be compliant with FAR §25.853. FAR §25.853 is the US regulation (FAA) dealing with the flammability standards for compartment interiors. This standard establishes limits in the broad categories of flame-resistance, smoke density, toxic gas emission, and heat release (referred to in the industry as FSTH).

There is a need for vehicle interiors, panels, and trim pieces that have improved tensile properties (including impact resistance), lighter weight, more economical than currently used products, and compliant with FAR §25.853, and that are easy and inexpensive to manufacture.

DESCRIPTION OF THE DRAWINGS

For the purpose of illustrating the invention, there is shown in the drawings a form that is presently preferred; it being understood, however, that this invention is not limited to the precise arrangements and instrumentalities shown.

SUMMARY OF THE INVENTION

An interior component for a vehicle may include a nonwoven fabric impregnated with a resin. The nonwoven fabric and resin are consolidated into a solid sheet devoid of pockets. The interior component may exclude metal coated filler particles and lubricants. The method of making the interior component includes the steps of: forming a nonwoven fabric of a staple fiber and a resin, consolidating the nonwoven fabric and the resin into a solid sheet, and forming the solid sheet into the vehicle component. The vehicle may be an airplane, train, subway car, light rail car, bus, or automobile. The resin may be a polymer selected from the group consisting of polyphenylene sulfide, polyetherimide, polyaryletherketone, co-polymers thereof, and combinations thereof.

DESCRIPTION OF THE INVENTION

The vehicle interior panel generally comprises a nonwoven fabric impregnated with a resin. The nonwoven and the resin are consolidated into a solid sheet. The sheet is devoid of pockets. Pockets refer to, for example, air pockets or open spaces within the sheet that may weaken the mechanical strength of the consolidated sheet. The sheet does not include thermally conductive metal coated particles (see, for example, U.S. Pat. No. 8,299,159, discussed below) or lubricants used or facilitate extrusion (see, for example, U.S. Pat. No. 8,129,462, discussed below).

Figure 1:
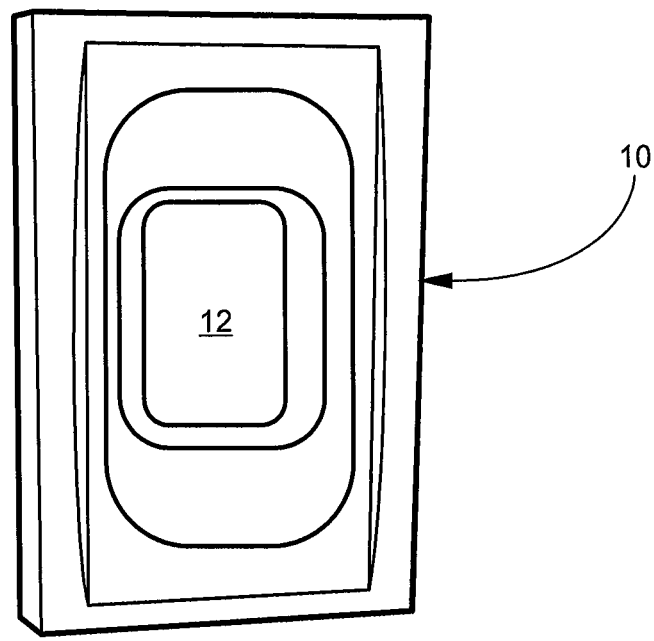
FIG. 1 is an illustration of an exemplary vehicle interior panel.

Vehicle interior panels, as used herein, refer to vehicle interiors, panels, and trim pieces. Such interior panels may include: window panels; ceiling panels; floor panels; overhead bins and bin doors; lavatory and galley wall structures; class divider and bulkhead panels; arm rests; seat trim; and the like. In one embodiment, the vehicle interior panel may be used a wall panel. In another embodiment, the vehicle interior panel may be used as a floor panel. An example of a vehicle interior panel is shown in FIG. 1. The interior panel 10 is a window trim panel with a cut-out 12 for the window.

Nonwoven fabric, or nonwoven, refers to randomly oriented staple fiber. In one embodiment, the nonwoven may be made by a wet-laid process, discussed in greater detail below. In this embodiment, the staple may have a length of about 0.125-1.25 inches. In other embodiments, the staple may have lengths in the range of 0.25-0.75 inches, or 0.5-0.75 inches. The staple orientation within the nonwoven may generally yield an anisotropic material with greater physical properties in the machine direction than in the transverse direction, see Table below.

The staple fibers may be made of any material having good tensile properties (e.g., tensile properties similar to the tensiles of filaments used to make structural/surface components of aircraft). Such materials include glass fiber, carbon fiber, lyotropic/thermotropic liquid crystal polymer fibers (e.g. aramids (KEVLAR, NOMEX, etc), aromatic polyesters (VECTRAN)), polybenzimidazole, and combinations thereof. In one embodiment, the staple fiber may be carbon staple fiber. In another embodiment, the carbon staple is recycled from carbon filament that may have been pre-impregnated with resin (pre-preg carbon filament). Such pre-preg carbon filament may be sourced from, for example, facilities that laid-up carbon filament panels for aircraft components. If recycled from pre-preg carbon filament, it is preferred the resin is thoroughly removed from the filament and the filament cut/chopped to staple length.

Resin, as used herein, refers to any resin capable of binding the staple fibers of the nonwoven into a solid sheet. In one embodiment, the resin may be a thermoplastic resin. A key feature of the resin is its melt flow index (material must readily flow in the molten state). The resin may be in any form, powder, pellet, fiber, pre-preg resin coating the fibers, or a combination thereof. In one other embodiment, the resin may be in the form of staple fibers. In one embodiment, the resin may be a polyphenylene sulfide (PPS), polyetherimide (PEI), polyaryletherketone (PAEK) or combinations thereof. In another embodiment, the resin may be PPS. In yet another embodiment, the resin may be a PPS staple fiber. PPS may be amorphous, crystalline, or a combination of both. PPS is commercially available, for example, as FORTRON by Ticona, Florence, Ky., and RYTON, Chevron Phillips, The Woodlands, Tex. PEI is commercially available, for example, as ULTEM, Sabic Innovative Plastics, Pittsfield, Mass. PAEK is commercially available, for example, from Victrex, Lancashire, UK, and Solvay Plastics, Houston, Tex. In other embodiments, the resins may include, in additions to those mentioned above, polyamides (PA), polyamide-imides (PAI), polyarylates (PAR), PAEKs (PEK, PEEK, PEKK, PEEKK), polyarylsulfones (PAS), polycarbonates (PC), polybutylene terephthalates (PBT), polyether sulfones (PES, PESV), high density polyethylenes (HDPE), ultra high molecular weight polyethylenes (UHMWPE), polyethylene terephthalates (PET), thermoplastic polyimides (TPI), liquid crystal polymers (LCP), polyphenylene ether blends (PPE, PPO), polysulfones (PSU), thermoplastic polyurethanes (TPUR), their copolymers, and combinations thereof.

The solid (or consolidated) sheet refers to the consolidated nonwoven fabric of staple fibers and resin. This sheet, in one embodiment, may be free of pockets, as discussed above. This sheet may have any thickness. In one embodiment, the sheet may have a thickness of about 0.0625-0.75 inches. In another embodiment, the thickness may range from about 0.0625-0.5 inches. In yet another embodiment, the thickness may range from about 0.125-0.25 inches. In still another embodiment, the thickness may be, as little as, for example, 6 mils (0.006 inches). This sheet may be formed into, for example, 4 by 8 foot sheets, or any other convenient size.

In one embodiment, the specific gravity may range from about 1.10-1.40. In another embodiment, the specific gravity may range from about 1.15-1.35. In yet another embodiment, the specific gravity may range from about 1.20-1.33.

In one embodiment, the sheet may have a tensile strength (ASTM 938) of at least about 250 Kpsi/inch (1 Kpsi=1000 psi). In another embodiment, the sheet may have a tensile strength of at least 275 Kpsi/inch. In yet another embodiment, the sheet may have a tensile strength of at least 300 Kpsi/inch. In still another embodiment, the sheet may have a tensile strength in the range of about 250-650 Kpsi/inch (including all subsets therein).

In one embodiment, the sheet may have a flexural strength (ASTM D790) of at least about 350 Kpsi/inch. In another embodiment, the sheet may have a flexural strength of at least 400 Kpsi/inch. In yet another embodiment, the sheet may have a flexural strength of at least 500 Kpsi/inch. In still another embodiment, the sheet may have a flexural strength in the range of about 350-950 Kpsi/inch (including all subsets therein).

In one embodiment, the sheet may have a flex modulus (ASTM D790) of at least about 12,000 Kpsi/inch. In another embodiment, the sheet may have a flex modulus of at least 15,000 Kpsi/inch. In yet another embodiment, the sheet may have a flex modulus of at least 20,000 Kpsi/inch. In still another embodiment, the sheet may have a flex modulus in the range of about 12,000-30,000 Kpsi/inch (including all subsets therein).

In one embodiment, the sheet may have an impact resistance (Notched IZOD, ASTM D256) of at least about 100,000 Joule/meter$^2$/inch (J/m$^2$/in). In another embodiment, the sheet may have an impact resistance of at least 150,000 J/m$^2$/in. In yet another embodiment, the sheet may have an impact resistance of at least 200,000 J/m$^2$/in. In still another embodiment, the sheet may have an impact resistance in the range of about 100,000-600,000 J/m$^2$/in (including all subsets therein). Impact resistance is a key parameter for vehicle interior panels.

The weight ratio of staple fiber to resin in the sheet may range from about 1-2:1-2. In one embodiment, the weight ratio may be in the range of about 1.0-1.5:1.0-1.5. In another embodiment, the weight range may be about 1.0:1.0-1.8. In yet another embodiment, the weight ratio may be about 1.0:1.2-1.7. In still another embodiment, the weight ratio may be about 1.0:1.3-1.6.

The vehicle interior panels may be formed from the solid sheet or a composite of the solid sheet and a core material. Additionally, the vehicle interior panel may be skinned with a protective film (e.g., a thermoplastic film which may have a decorative aspect as well) as is customary in the art. The consolidated sheet, when at the desired thickness, may replace the composites previously used in the vehicle interior panels (mentioned in the Background section above). The composite may be formed where the consolidated sheet forms the skin, on at least one side, of a core structure. The core structure may be any structure that may provide increased structural to the composite. One example of a core structure is a honeycomb material, as is known in the art. Such honeycomb materials may include NOMEX and aluminum. The consolidated sheet may form a skin on both sides of the core structure. In one embodiment, the consolidated sheet is affixed to the core material without a binder. In another embodiment, the consolidated sheet is affixed to the core material with a binder. The binder may be, for example, an epoxy or a heat activated epoxy, but other binders may be used. These vehicle interior panels may be compliant with FAR §25.853.

The following references are not directed to vehicle interiors, panels, and trim pieces, as discussed above, but, disclose materials consisting of resins and fibers.

In U.S. Pat. No. 7,387,828, the web comprises an intimate mixture of long reinforcing fibers (e.g., carbon fiber staple, 2-4 inches in length) and resin (e.g., PPS). The reinforcing fibers are mutually parallel; therefore the reinforcing fibers are not a nonwoven.

In U.S. Pat. No. 8,129,462, the extrudable resin comprises a high temperature engineering thermoplastic (e.g., PPS), reinforcement components (e.g., glass fiber), filler (e.g., TiO$_2$), and lubricant (e.g., PTFE). This resin is used to make pipes, liners, or similar shapes.

In U.S. Pat. No. 8,299,159, the thermally-conductive moldable thermoplastic composition comprises a matrix polymer (e.g., PPS), metal-coated filler particles, and secondary filler (e.g., carbon fiber). This composition is used in heat dissipation applications.

Figure 2:
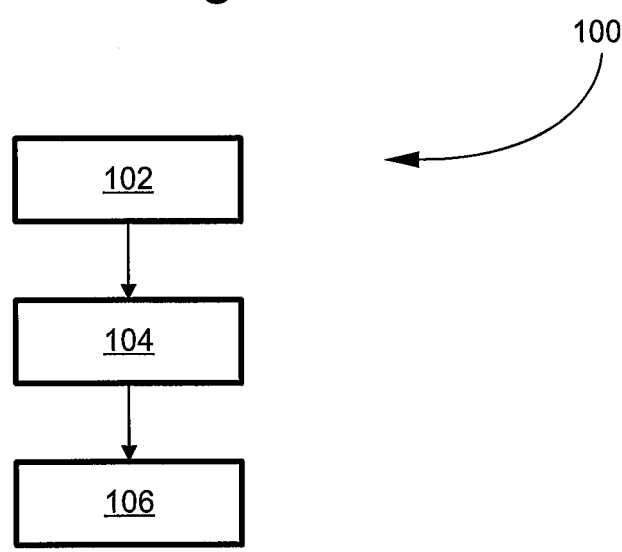
FIG. 2 is a flow chart of an embodiment of the method to manufacture the vehicle interior panel.

FIG. 2 illustrates the flow chart for an embodiment of the manufacturing process 100. The vehicle interior panel may be manufactured, in general, by: forming a nonwoven fabric of a staple fiber and a resin 102, consolidating the nonwoven and resin into a solid sheet 104, and forming the solid sheet into the vehicle interior panel 106.

The nonwoven may be made by any process for forming nonwovens. In one embodiment, the nonwoven is formed by a wet-laid process. In this process, the staple fiber and resin, for example in the form of staple fiber, are mixed together, with a suitable liquid, to form a furnish. The consistency of the furnish (weight of fiber/weight of liquid×100) may range from about 0.25-1.0% (or about 0.3-0.7% or about 0.5%).

Dispersants, defoamers, and viscosity modifiers may be added to the furnish in conventional amounts. The furnish is de-liquefied (e.g., by passing it over an inclined wire machine).

The de-liquefied sheet is dried.

This dried sheet is then consolidated with heat and pressure. The amount of heat and pressure will be dependent upon the choice of resin. In one embodiment, when PPS is used as the resin, the temperature may be about 590° F. (range may be 545-645° F., or 580-610° F., & all subsets thereof), and the pressure may be about 100 psi (range may be 50-350 psi, or 50-250 psi, & all subsets thereof). Consolidation may be accomplished, for example, in a heated platen press or double belt press, or by bringing the material to temperature and calendering. To obtain the desired basis weight, it may be necessary to laid up several (2+) of the de-liquefied sheets and consolidate the laid-up sheets together. Alternatively, the de-liquefied sheet may have the desired basis weight and no lay-up is necessary.

The consolidated sheet is then formed into the vehicle interior panel. The consolidated sheet may also be formed by any suitable process. Such processes include, for example, molding (match or stamp), vacuum forming, autoclaving, or a combination thereof. The parameters of these processes will be governed by choice of resin, thickness and weight of the consolidated sheet, to name a few, as will be understood by those of ordinary skill.

Before, after, or during the formation of the vehicle interior panel, the panel may be laminated with a film (e.g., a thermoplastic film that adds protection and/or a decorative aspect to the panel).

The invention may be further understood by reference to the following examples of the invention and their comparison to existing products used as vehicle interiors, panels, and trim pieces.

EXAMPLES

In the following Table, the present invention is compared to materials currently being used as vehicle interior panels.

| | KYDEX 0.125" | KYDEX 0.125" | KYDEX 0.125" | BOLTARON 0.125" | ULTEM 0.126" | ULTEM 0.126" | INVENTION 0.054" | INVENTION 0.062" |
|---|---|---|---|---|---|---|---|---|
| Product Designation | FSTH | 6565 | 6200 | 9915FST | 0% glass | 30% glass | 40% C/60% PPS | 40% C/60% PPS |
| Full Compliance with FAR 25.853 | YES | NO | NO | YES | YES | YES | YES | YES |
| Chemical Components | Acrylic/ PVC/ LEXAN | Acrylic/ PVC | Acrylic/ PVC | Acrylic/ PVC/ LEXAN | PEI | PEI/Glass | Carbon fiber/ PPS | Carbon fiber/ PPS |
| Thickness range offered (inch) | 0.060-0.187 | 0.028+ | 0.028+ | 0.040-0.187 | 0.003-4.0 | 0.003-4.0 | 0.006+ | 0.006+ |
| Specific Gravity | 1.34 | 1.46-1.49 | 1.38 | 1.34 | 1.27 | 1.51 | 1.22 | 1.31 |
| Weight 4' × 8' sheet (pounds) | 27.87 | 30.37/ 30.99 | 28.7 | 27.87 | 26.62 | 31.65 | 10.96 [0.125"-27.1] | 13.51 [0.125"-27.1] |
| Tensile Strength ASTM 938 | | | | | | | | |
| (PSI) | 10,400 | 6,500 | 6,000 | 10,600 | 16,000 | 24,500 | 32,778/21,175 | 19,290/19,580 |
| (MPa) | 74 | 45 | 41 | 73 | 110.38 | 169 | 226/146 [MD/TD] | 133/135 [MD/TD] |
| Flexural Strength ASTM D-790 | | | | | | | | |
| (PSI) | 16,600 | 10,000 | 9,200 | 16,700 | 23,900 | 33,000 | 37,410/41,615 | 23,780/44,865 |
| (MPa) | 107 | 70 | 63 | 115 | 151.7 | 227 | 258/287 | 164/309 |
| Flex Modulus ASTM D-790 | | | | | | | | |
| (PSI) | 362,000 | 420,000 | | 363,000 | 509,000 | 1,300,000 | 1,122,591/ 1,372,056 7,740/9,460 | 461,220/ 735,341 3,180/5,070 |
| (MPa) | 2,320 | 2,896 | | 2,502 | 3,510 | 8,960 | | |
| Impact Resistance Notched IZOD ASTM D256 | | | | | | | | |
| (J/m2) | 194 | | 187 | 265 | 1326 | 488 | 22,000/15,800 | 13,674/13,356 |
| (Ft-pounds/inch2) | 3.63 | | 3.5 | 5 | 25.01 | 9.2 | 411/295 | 258/252 |
| Rockwell Hardness ASTM D 785 | | | | | | | | |
| (R Scale) | 125 | 98 | | 107 | 109 | 114 | | |
| Molding Temp (° F.) | 330-400 | 325-390 | | 360-400 | | | 580-620 | 580-620 |

The present invention may be embodied in other forms without departing from the spirit and the essential attributes thereof, and, accordingly, reference should be made to the appended claims, rather than to the foregoing specification, as indicating the scope of the invention.

We claim:

1. An interior component for a vehicle comprising: a nonwoven impregnated with a resin, said nonwoven and said resin are consolidated into a solid sheet devoid of pockets, and excluding metal coated filler particles and lubricants, said resin is a polymer selected from the group consisting of polyphenylene sulfide, polyetherimide, co-polymers thereof, and combinations thereof.

2. The interior component of claim 1 wherein said nonwoven comprises staple fibers.

3. The interior component of claim 1 wherein said nonwoven is a wet laid nonwoven.

4. The interior component of claim 1 wherein said nonwoven comprises carbon fibers.

5. The interior component of claim 4 wherein said carbon fibers is recycled carbon fibers free of any pre-impregnation resin.

6. The interior component of claim 1 wherein said resin is selected from the group consisting of polyphenylene sulfide, co-polymers thereof, and combinations thereof.

7. The interior component of claim 1 wherein the weight ratio of nonwoven to resin is in a range of 1.0-1.5:1.0-1.5.

8. The interior component of claim 7 wherein the weight ratio of nonwoven to resin is in a range of 1.0:1.2-1.7.

9. The interior component of claim 1 wherein the vehicle is an airplane, or a train, a subway car, or a light rail car, a bus, or an automobile.

10. An interior panel for a vehicle comprising: a nonwoven of carbon staple fibers impregnated with a resin selected from the group consisting of polyphenylene sulfide, polyetherimide, polyaryletherketone, co-polymers thereof, and combinations thereof, a weight ratio of nonwoven to resin is in a range of 1.0:1.2-1.7, said nonwoven and said resin are consolidated into a solid sheet devoid of pockets, and having has an impact resistance of at least about 100,000 Joule/meter$^2$/inch (J/m$^2$/in).

11. A method of making an interior component for a vehicle comprising the steps of:
    forming a nonwoven having staple fibers and a resin being a polymer selected from the group consisting of polyphenylene sulfide, polyetherimide, polyaryletherketone, co-polymers thereof, and combinations thereof, and
    consolidating the nonwoven and the resin into a solid sheet devoid of pockets.

12. The method of claim 11 further comprising the step of: forming the solid sheet into the interior component.

13. The method of claim 11 wherein forming the nonwoven comprising a wet laid process.

14. The method of claim 11 wherein the staple fibers being carbon staple fibers.

15. The method of claim 13 wherein contacting the nonwoven with the resin comprising mixing the resin into a furnish.

16. The method of claim 11 wherein consolidating the nonwoven and the resin comprising heating the nonwoven and the resin under pressure.

17. The method of claim 16 wherein the temperature being at least 545° F.

18. The method of claim 16 wherein the pressure being sufficient to form the solid sheet devoid of pockets.

19. The method of claim 18 wherein the pressure being at least 50 psi.

20. The method of claim 18 wherein the pressure being in a range of 50-350 psi.

21. The interior component of claim 1, wherein the resin further includes a polyaryletherketone or co-polymer thereof.

* * * * *